June 27, 1961  E. H. TREFF ET AL  2,989,867
WATER METER WITH FRANGIBLE COVER
Filed Oct. 10, 1955  2 Sheets-Sheet 2
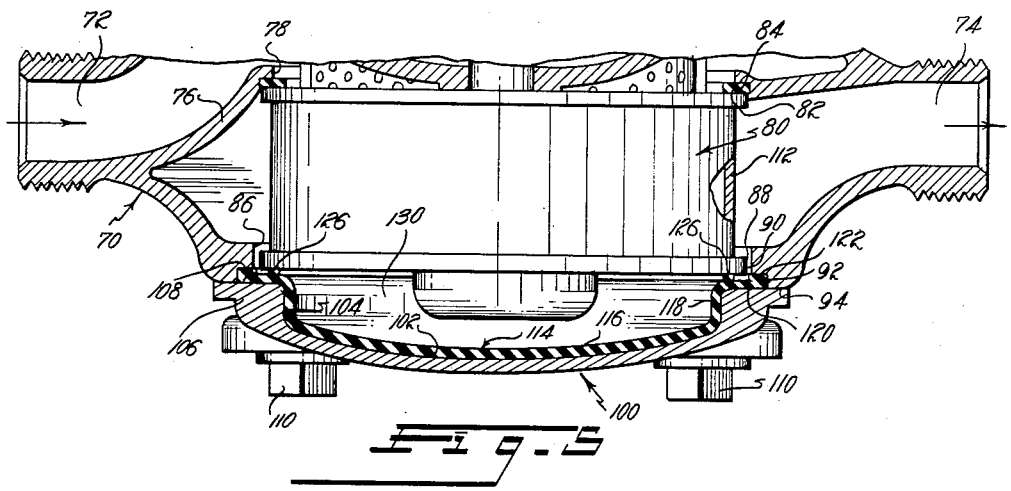
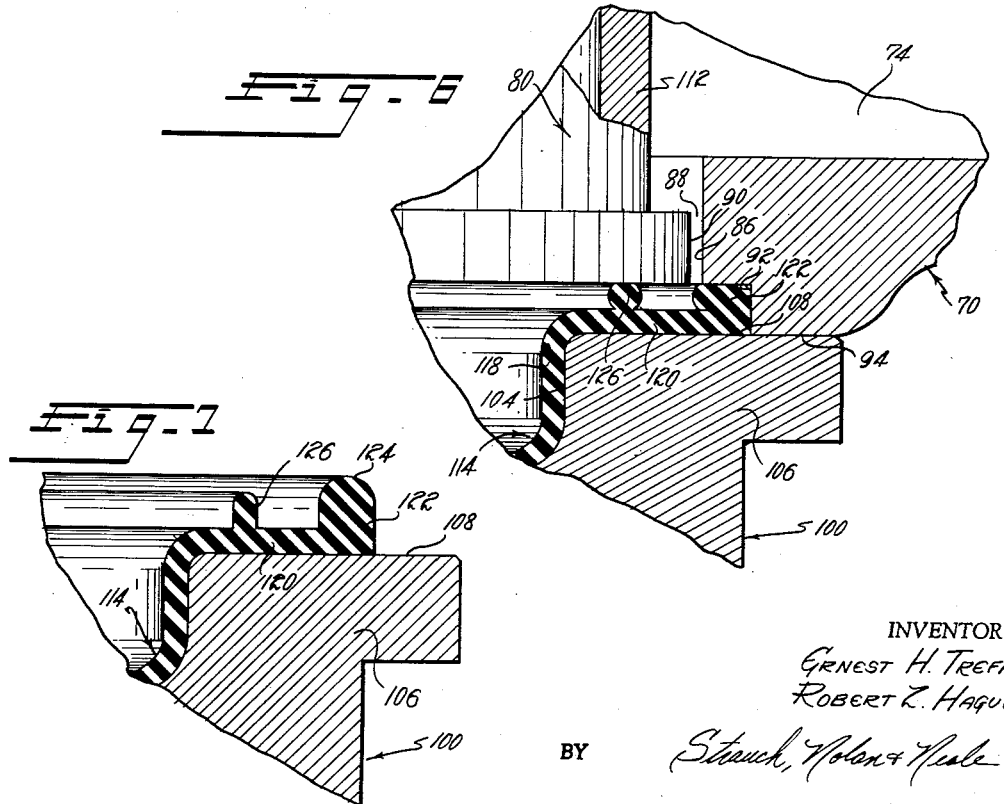
INVENTORS
ERNEST H. TREFF
ROBERT L. HAGUE
BY Strauch, Nolan & Neale
ATTORNEYS

# United States Patent Office 2,989,867
Patented June 27, 1961

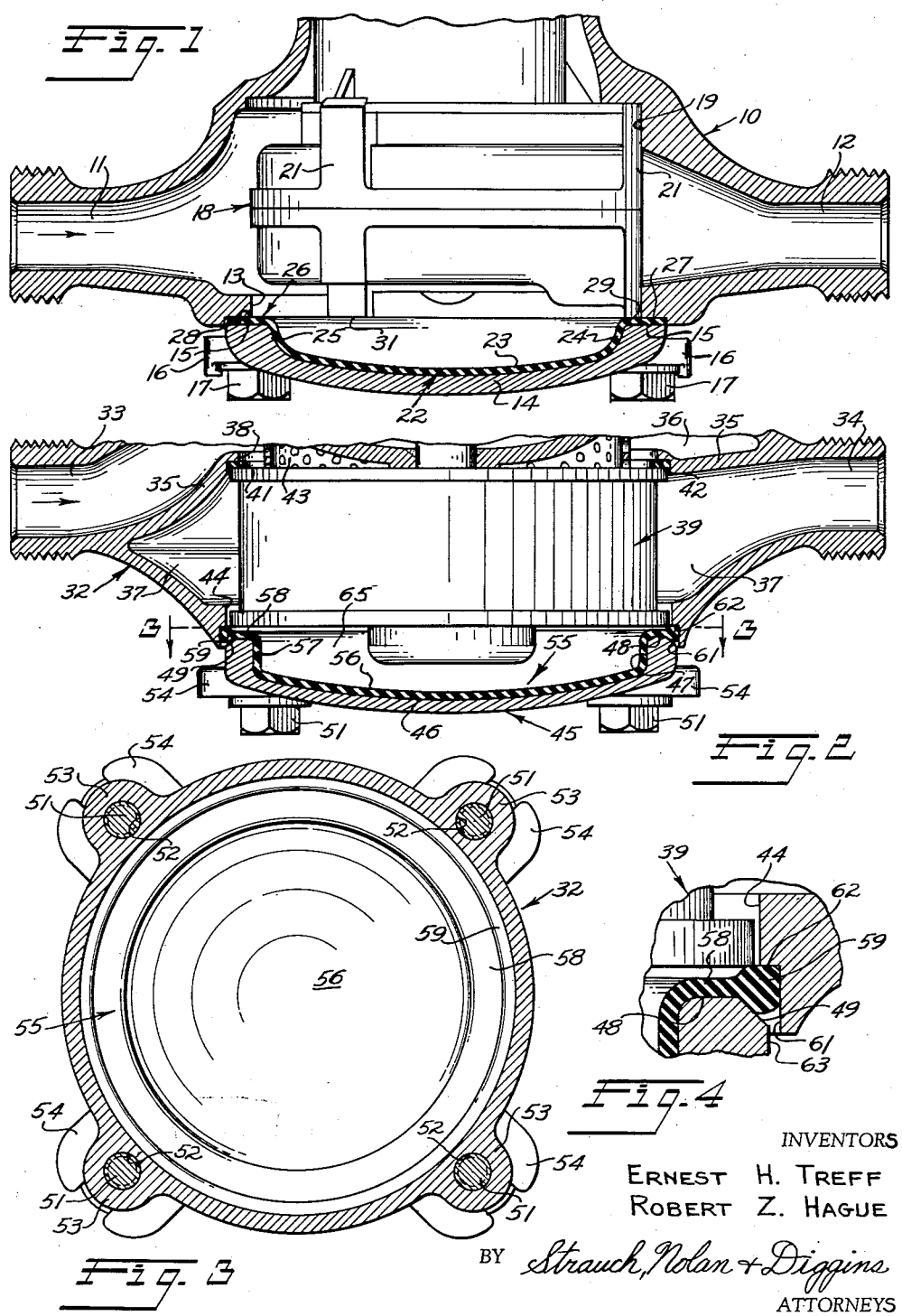

2,989,867
WATER METER WITH FRANGIBLE COVER
Ernest H. Treff, East Aurora, N.Y., and Robert Z. Hague, Oradell, N.J., assignors to Rockwell Manufacturing Company, Pittsburgh, Pa., a corporation of Pennsylvania
Filed Oct. 10, 1955, Ser. No. 539,579
17 Claims. (Cl. 73—277)

The present invention relates to improvements in liquid metering devices and more particularly to improvements in the lining and sealing of meter bottom plates, and is a continuation-in-part of application Serial No. 265,844, filed January 10, 1952, and now abandoned.

In liquid meters for use in cold climates an important design consideration is the provision for the relief of the pressure built up within the meter by the expansion of metered liquid, such as water, if it should freeze. Without such provision, the meter may be severely damaged.

One form of such protection is the provision of a flexible diaphragm peripherally clamped by a cover over an access opening formed in the meter casing. United States Letters Patent No. 1,971,026, issued August 21, 1943, to L. M. Beall discloses this form of meter frost protection.

This form of frost protection relies upon the flexibility of the diaphragm and the cushioning effect of the air chamber between the diaphragm and the clamping cover to accommodate expansion of the liquid as it freezes. However, in such meters an increase in liquid pressure within the meter casing will produce a continuously greater deflection of the diaphragm resulting in improper support of the measuring device within the casing and damage to the measuring device when actual freezing occurs. Diaphragms which are continuously under stress, as they are in these meters, must be frequently replaced because the material of which they are made cannot withstand continual stress without permanent deformation.

One of the more recent common and more practical solutions of this problem is the provision of a detachable, frangible, expendable frost plate which will hold the meter parts in their normal assembled operating positions until the pressure builds up to a critical range, above which would result in damage to the meter parts, and which will break at such critical pressure range to relieve the pressure of the meter casing at such pressure to prevent damage of the meter casing and the enclosed measuring device. United States Letters Patent No. 2,406,877, issued September 3, 1946, to A. R. Whittaker discloses a fluid meter which is frost protected in this manner.

A frost plate for a meter of this type is generally in the form of a concave-convex base plate having lugs formed integrally therewith by which the frost plate is secured to the meter casing. The strength of the juncture of these mounting lugs with the base plate determines the pressure at which the frost plate will break, breakage occurring by the servering of the main portion of the plate from the lugs at their juncture.

Since it is preferable for the lugs to break when the critical pressure range is reached without prior deflection or deformation so that the meter parts will be held rigidly in normal operating position until the critical pressure range is reached, a frangible metal such as cast iron is ideally suited for such frost plates but, due to the ease with which cast iron rusts, its use presents certain difficulties.

It has recently become customary to provide a thin frost plate liner made of corrosion resistant metal such as copper or brass to prevent contact between the fluid flowing through the meter and the interior surface of the cast iron frost plate and to provide gaskets between the liner and the mating surface of the meter casing to prevent the leakage of liquid from the meter casing therebetween. Such an arrangement is disclosed in the aforesaid Whittaker patent. This arrangement, while generally satisfactory for the intended purposes, requires the use of critical metals not readily available, the manufacture and stocking of numerous separate parts, and the assembly of these numerous parts individually. All of these factors increase the cost of manufacture and maintenance of fluid meters protected against frost in this manner.

A further disadvantage of the prior art meters with metal liners is that unless the interior surface of the frost plate is accurately machined, the metal liner will not closely conform thereto on initial assembly. Since frost plates are inherently expendable parts, accurate machining is not commercially feasible. A common practice has been to make formed metal liners sufficiently smaller than the frost plates with which they mate so the liners will fit freely therein. Since such thin liners are not strong enough to withstand the full line pressure, they become reshaped to some extent to conform to the surface characteristics of the frost plate when line pressure is applied. Such reshaping of the liner often results in wrinkling of the metal liner and producing stresses therein which accelerate corrosion. Also, since the normal line pressure will not reshape the liner so that it completely conforms to the surface irregularities of the frost plate air pockets exist between the liner and the frost plate. Such pockets act as cushions when freezing takes place and prevent direct transmission of the increased pressure to the frost plate. When ice forms inside the meter, it is important that the resultant force developed to be transmitted directly to the frost plate to break the mounting lugs and relieve the internal high pressure before damage to the meter parts occurs. Such air pockets prevent or delay this.

In many water meter structures, the strength of the casing is not great enough to provide the heavy pressures necessary to accomplish sealing with metallic gaskets. Water meters equipped with a frost base plate require a casing that will be tight up to 550 to 600 p.s.i. water pressure and will, upon higher pressures, break the base plate to relieve the internal pressure in cases of freezing. The prior art has recognized this difficulty of creating a water tight meter casing which will still break at prescribed pressures. The United States Patent No. 1,187,679 to Tilden points out that the arrangement of the meeting surfaces between the main portion of the casing and bottom-plate has been such that strain upon the parts necessary to insure a water-tight joint frequently breaks the separable portion either when assembling the casing or during normal use of the apparatus.

In addition metals practically usable in forming such liners, are not satisfactorily corrosion resistant to certain waters.

In view of the foregoing considerations, it is a primary object of our invention to provide an improved frost plate protected liquid meter having a single member adapted to line the frost plate, to prevent corrosion without inhibiting the application of the pressure within the meter casing to the frost plate, and to serve as a sealing element to prevent leakage of the metered liquid from the meter casing around the edge of the frost plate.

A further important object of our invention is the provision of a combined liner and peripheral sealing element for a frost plate protected liquid meter having a central concavo-convex portion conformable under line pressure to the surface irregularities of a frost plate and a peripheral, radially extending flange the outer region of which is formed to provide a liquid tight seal between the meter casing and the frost plate.

In the prior meter constructions it has been common practice to use ordinary flat sealing gaskets between the bottom cover plate and the casing structure. To secure satisfactory seals with such gaskets it has been necessary to use heavy rigid metal casing and cover plate structures to provide the necessary clamping pressures and to resist line pressure deformations tending to cause leaks. We have found that by combining an integral flexible sealing rim with our improved liner, the clamping pressures may be substantially reduced and the effects of line pressure distortions are modified to such an extent that the weight and rigidity of the casing and cover structures may be substantially reduced with resultant reductions in cost and weight of the entire meter. These improved liners may be used to advantage with any cover plate structure as well as the frost plate covers, for superior corrosion protection and permitting the use of inexpensive metal in the cover plate.

It is accordingly another object of our invention to provide a novel combination of meter casing cover plate and integral seal-liner, providing a substantially lower cost meter construction.

A further object of the invention is to provide a cup-shaped frost plate liner of an elastomer, soft rubber, polyethylene or like very resilient material having an edge flange serving as a sealing gasket.

A more specific object of our invention is to provide a combined flexible frost plate liner and sealing element in which the outer region of the flange portion is in the form of a flexible O-ring.

A further specific object of our invention is to provide in a frost plate protected liquid meter a combined liner and sealing element for the frost plate which is a single member formed of a moldable, non-corroding, elastomeric flexible material such as rubber.

In many meter apparatus, the meter measuring chamber is seated within the casing and is maintained therein by cooperation with the base-plate gasket and base-plate flange when the base-plate is tightened in position. In some types of installations uneven bulging of the cover seal gasket, upon tightening of the base-plate, will place uneven pressures on the bottom of the measuring chamber resulting in canting or cocking of the chamber and distortion of lightweight chamber walls. Measuring chambers as disclosed in FIGURES 2 and 5 are particularly susceptible to canting and cocking.

Accordingly a still further object of this invention is to provide a combined frost plate liner and sealing element with special sealing formations that enable a tight seal between the frost plate and meter casing yet will maintain the measuring chamber in accurately aligned position without danger of canting, cocking or distortion due to uneven pressures resulting from distortion of the sealing element.

Still another object is to provide in a meter casing a seal-liner made of an elastomer and having a plurality of coaxial annular rings or beads, the outermost bead being used as a seal between the meter casing and cover plate and an inner bead providing a resilient structure to maintain and properly align a measuring chamber inside the meter casing.

These and other objects of our invention will become apparent by reference to the appended claims and to the detailed description of our invention which follows in reference to the accompanying drawing wherein:

FIGURE 1 is a partially sectioned view in elevation of an improved meter assembly of the general type disclosed in the aforesaid Whittaker patent and embodying a form of a combined seal and liner constructed according to our present invention;

FIGURE 2 is a partially sectioned view in elevation of an improved meter assembly equipped with a second embodiment of our combined seal and liner construction;

FIGURE 3 is a sectional view of the base structure of the meter assembly of FIGURE 2 taken along the line 3—3 of FIGURE 2;

FIGURE 4 is an enlarged fragmentary section showing the liner rim bead of the embodiment illustrated in FIGURE 2 compressed between the cover and casing;

FIGURE 5 is a partially sectioned elevation view of a further improved meter assembly equipped with a third embodiment of our combined seal and liner construction;

FIGURE 6 is an enlarged detail view of the embodiment illustrated in FIGURE 5, showing the seal flange beads compressed against the meter casing and the lower edge of the measuring chamber; and FIGURE 7 is an enlarged detail section view illustrating the relative shapes of the seal flange beads prior to assembly.

A meter assembly of the type disclosed in the aforesaid Whittaker patent is shown in FIGURE 1. This meter is provided with cast metal casing 10 which is generally hollow and formed with inlet 11 and outlet 12. A relatively large access opening 13 is provided in the bottom wall of the casing and a concavo-convex cover 14 formed with a flat annular seating rim face 15, and equiangularly spaced, radially outwardly extending mounting lugs 16, is detachably secured to casing 10 over access opening 13 as by bolts 17 extending through aligned mounting lugs (not shown) formed on the exterior of the casing 10.

Casing 10 includes a transversely extending partition (not shown) which closes the top of the casing so that casing 10 and cover 14 form a closed liquid reservoir between the inlet 11 and the outlet 12. Measuring chamber 18, which may be of the oscillating piston type disclosed in said Whittaker patent, is rigidly transversely aligned within the casing 10 by the coaction of circumferentially spaced piloting surfaces 19 internally of the casing with mating piloting surfaces 21 on the exterior of the measuring chamber. Mating piloting surfaces 19 and 21 all have the form of surface segments of a cone having its apex located above the measuring chamber.

Water flows into the meter casing through inlet 11, surrounds the measuring chamber, enters the measuring chamber through ports (not shown) formed in its top and bottom wall, and is discharged through a radial port formed in the cylindrical side wall in alignment and liquid tight relation with the outlet 12 of casing 10, all as explained in detail in said Whittaker patent, to which reference is made if further details of the meter construction and operation are found to be necessary to a complete understanding of the present invention.

Cover 14 is made of a rigid but frangible material, such as cast iron, so that, when pressure within the meter casing builds up to a predetermined value, as when the water freezes, the concavo-convex central portion of cover 14 will be fractured from its mounting lugs 16 to relieve the pressure and prevent damage of the meter casing or the measuring chamber.

As previously indicated, in selecting the material for frost plates, two primary considerations must be borne in mind. Structurally, the frost plate must be rigid so as not to deflect or deform under the load of a pressure less than the full pressure at which the plate is designed to break, or improper operation of the measuring device will result. The material of which the frost plate is made must be inexpensive because the frost plate must be replaced by a new plate after it has once performed its pressure relief function. Cast iron is, of course, ideally suited for this purpose, as it meets both of the above requirements, but, if used, it must be protected against rusting.

In lieu of the brass or copper frost plate liners and the separate gaskets heretofore used, respectively, to prevent corrosion of the cast iron frost plate and to form a liquid tight seal between the casing 10 and the cover 14 around the access opening 13, and which require heavy sealing pressures, we have provided a single member 22 made of thin elastic, flexible, non-corrosive water impermeable material such as soft rubber or a plastic such as polyethylene. Member 22 is cup-shaped with a central concavo-convex bottom portion 23 of substantially the shape and size of the internal concave face of cover 14. Member 22 has a sloping side wall 24 fitting in side wall 25 of the covtr and an integral flat flange 26 extending radially outward from its peripheral edge and lying substantially in a plane. The junctures of side wall 24 with bottom 23 and flange 26 are oppositely rounded so that no sharp corners exist. The outer annular portion 27 of flange 26, when the meter is assembled, is compressed between the annular flat face 15 on cover 14 and the adjacent parallel machined surface 28 that is undercut and surrounds opening 13 on casing 10, to thereby form an annular liquid tight seal between the casing 10 and the cover 14 around the access opening 13.

The internal annular portion 29 of flange 26, which is entirely backed by surface 15 abuts on its other side against the spaced machined flat bottom support surfaces 31 of the measuring chamber 18, which, in assembly, are located in a plane slightly above the plane of surface 28. This supports and maintains the measuring chamber in its vertical position wherein the conical piloting surfaces 19 and 21 are wedged together frictionally.

Member 22 thus provides an integral combined frost plate liner and annular sealing element between the cover 14 and the casing 10 around the access opening 13. Preferably, member 22 is of synthetic rubber or polyethylene molded in substantially the shape of the inner surface of cover 14, as shown in the drawing. In installation it is merely dropped into the cover and the cover bolted to the casing 10. When line pressure is applied to the meter, member 22 being elastic, its bottom and side walls are forced into intimate surface contact with the adjacent surfaces of the frost plate cover 14. By fairly snugly fitting member 22 to the frost plate we thus have eliminated air pockets of appreciable size between the liner and frost plate end, when the water in the meter freezes, the increased pressure is transmitted directly to the frost plate through the liner without objectionable air cushioning.

A combined liner and sealing element of the form shown in FIGURE 1 can be easily and inexpensively molded and eliminates the necessity of forming and stocking individual liner and gasket parts. It provides a seal between the casing and cover in the assembly without necessitating the heavy pressures required by metal gaskets and serves as a more effective frost plate liner than the prior art sheet metal liners since it has superior corrosion resistance. A liner of polyethylene is resistant to acids and molds, won't chip or crack and is substantially tearproof.

Polyethylene has a so-called ability to breath yet remain fully waterproof. Thus a liner of polyethylene has peculiar advantages in this particular water meter application. The liner under water pressure will permit the small air bubbles trapped in the cover inner surface irregularities to pass through the minute liner pores, yet it prevents water from passing through the liner to contact the cover. The liner will therefore exactly conform and transmit pressure to the entire adjacent cover surface because no air bubble can remain between liner and cover.

This combined frost plate liner and sealing element of the invention may be used as a replacement part for the separate gaskets and metal liners previously used without modification of the meter structure.

A second embodiment of our invention is disclosed in FIGURES 2 and 3.

The water meter shown in FIGURES 2 and 3 is provided with a generally hollow casing 32 having an inlet 33, an outlet 34 and a transverse partition 35 dividing the casing internally into an annular inlet chamber 36 and an annular outlet chamber 37. Partition 35 is formed with a large central opening 38 closed by the top wall of a measuring chamber 39, which is preferably of the oscillating piston type. An annular gasket 41 si mounted in an undercut recess 42 surrounding opening 38 and is interposed between the adjacent peripheral edges of the measuring chamber 39 and the opening 38 to seal the inlet chamber 36 from the outlet chamber 37.

The liquid to be metered enters the meter casing through inlet 33, flows into inlet chamber 36 and through an annular strainer 43 into the measuring chamber 39, from which it flows into outlet chamber 37. A fluid inlet port (not shown) is formed in the top of measuring chamber 39 to permit entry of fluid from the inlet chamber. A fluid outlet port (not shown) is formed through the cylindrical side wall of the measuring chamber to permit discharge of the fluid into the outlet chamber 37 and through the meter casing outlet 34.

Meter casing 32 is formed with an access opening 44 in its bottom wall through which the measuring chamber 39 may be inserted into or removed from the casing. Opening 44 is closed by a cover 45 having a concave inner surface 46 and a cylindrical side surface 47. The rim of cover 45 has a flat annular face 48 lying in a plane transverse to the cylindrical side surface 47 and has an outer edge formed with a beveled continuous annular face 49. Cover 45 is secured to the casing by a plurality of bolts 51 threaded in tapped holes 52 in bosses 53 integral with casing 32 and circumferentially spaced around access opening 44, as is best shown in FIGURE 3. The shanks of bolts 51 pass through suitable mounting lugs 54 integral with cover 45 so that tightening of bolts 51 secures the cover on the casing.

When cover 45 is constructed as a frangible frost plate, an increase in pressure within the meter casing above a predetermined value resulting from freezing of the fluid being metered will cause the central portion of the cover to be severed from lugs 54 to relieve the pressure within the meter.

The combined liner and sealing element shown in FIGURES 2 and 3 is designated by the reference numeral 55. Element 55 is circular and cup-shaped with a concavoconvex bottom 56, an annular side wall 57 and a radially extending annular flat thin flange 58 which extends over rim face 48 of the cover. The outer edge of flange 58 is thickened to provide a ring or bead of uniform substantially circular cross-section 59 supported from below by beveled face 49. A recess having a cylindrical wall 61 and a flat annular bottom wall 62 surrounds casing opening 44, and the side and top of ring 59 engage these walls respectively.

The diameter of the cylindrical outer surface 63 of the cover is slightly smaller than that of recess wall 61. In assembly, the cup-shaped member 55 which is molded of elastomeric material such as synthetic rubber or the like is dropped into the cover wherein it fits fairly snugly. The cover is placed on the casing and bolts 51 tightened. Ring 59 is seated within the casing recess surrounding opening 44 and, when the bolts are tightened, face 49 exerts a wedging action that deforms the ring 59 into tight increased surface engagement with the casing and the cover to provide a continuous liquid tight seal. The pressure of the liquid in chamber 37 serves to urge the ring 59 more tightly into sealing contact with the casing and cover.

As illustrated in FIGURE 4, the lower end of measuring chamber 39 is of slightly smaller diameter than access opening 44 which surrounds it. The ring 59 when compressed between the casing and cover deforms to project inwardly beneath the outer peripheral corner of the measuring chamber to thereby resiliently urge the measuring chamber toward gasket 41 which seals the upper end of the measuring chamber in fluid tight relation with the casing. Due to the resiliency of the seal flange ring 59, measuring chamber 39, which may be of bronze or hard rubber, is free to expand or contract with variations in ambient temperature and the temperature of the liquid normally encountered in service without affecting the efficiency of the liquid seal or unduly loading the measuring device.

A third and improved embodiment of our invention is disclosed in FIGURES 5, 6 and 7.

The water meter illustrated in FIGURE 5 is essentially identical to that of FIGURE 2, differing in the edge formation around the casing opening and cover flange and the specific shape of the sealing flange of the combined seal and liner. The meter has a generally hollow casing 70 with an inlet 72, outlet 74 and partition 76 dividing the casing internally. A central opening 78 in partition 76 is closed by the top wall of a measuring chamber 80, preferably of the oscillating piston type. An annular gasket 82 is mounted in an undercut recess 84 surrounding the partition opening 78 and, in assembly, is compressed between the adjacent peripheral edges of the top of the measuring chamber 80 and the opening 78 to seal the upper and lower casing chambers. Metered liquid flow is the same as described for the meter shown in FIGURE 2.

Casing 70 is formed with an access opening 86 in its bottom wall through which the measuring chamber 80 may be inserted and removed. The dimension of access opening 86 is of sufficient size to provide an annular free space 88 between the lower pripheral side edge 90 of the measuring chamber 80 and the wall of casing opening 86 for a purpose that will become apparent. The exterior edge of casing opening 86 is formed with an undercut recess 92 and the surrounding annular portion 94 of the bottom of casing 70 is machined in a flat substantially plane surface.

The casing opening 86 is closed by a cover 100 having a concave inner surface 102 and a cylindrical side surface 104. Cover rim 106 is wider than the rims of the covers illustrated in FIGURES 1 and 2 and has a flat annular upper face 108 arranged transverse to the cylindrical side surface 104. When the cover 100 is secured to the casing by bolts 110, threaded in tapped holes in lugs on the casing, as described in conjunction with FIGURES 2 and 3, the outer peripheral portion of the cover rim face 108 abuts against the plane surface 94 surrounding the casing opening 86, thus assuring an accurate location of the cover in relation to the casing. The inner peripheral portion of the cover rim face 108 is disposed immediately below the bottom peripheral portion of the measuring chamber 80, and is preferably of such dimension as to be disposed below the cylindrical side wall 112 of the measuring chamber. As in the previously described embodiments, when cover 100 is constructed as a frangible frost plate, an increase of pressure within the meter casing above a predetermined value resulting from freezing of the fluid being metered will cause the central portion of the cover to be severed from the attaching lugs to relieve the pressure within the meter.

In this embodiment, the combined liner and sealing element 114 has a circular cup-shaped concavo-convex bottom 116, a substantially cylindrical side wall 118 and a radially extending annular flange 120. At the outer periphery of flange 120 is an integral annular thickened section forming a ring or bead 122. The cross section shape of bead 122 may be round, square or other suitable shape but the shape illustrated in FIGURE 7, providing an upstanding bead 122 with curved upper surface 124, is preferred. A second annular ring or bead 126, which need not be continuous, is formed concentric with and radially within bead 122, integral with and upstanding from the upper surface of flange 120.

The integral liner and sealing element 114 has an external shape enabling it to be snugly placed inside the cover 100 in substantial surface engagement with cover surfaces 102 and 104 and with the flat lower surface of flange 120 extended over the cover rim surface 108 to a position intermediate the width of the rim 106. The outer diameter of the seal-liner flange 120 is dimensioned to permit the outer bead 122 to fit into the recess 92 in the edge of casing opening 86. As is seen in a comparison of FIGURES 6 and 7, when the seal-liner 114 is placed within cover 100, outer bead 122 extends above the surface 108 of cover rim 106 a distance greater than the depth of casing recess 92. With the seal-liner 114 in place and the cover 100 fastened to casing 70, the seal-liner bead 122 will be sealingly compressed between the cover rim surface 108 and recess 92 as shown in FIGURES 5 and 6. When the cover bolts are tightened enough to cause abutment between the cover rim surface 108 and the plane surface 94 on the bottom of the casing, bead 122 will be deformed to substantially fill the recess 92. Excess bead material will protrude radially inward as shown in FIGURE 6 but, due to the spacing 88 between the casing opening 86 and the peripheral edge 90 of the measuring chamber 80, the deformed bead does not contact and exert pressures against the measuring chamber wall. As in the embodiment of FIGURES 2 and 3 the pressure of the liquid in casing 70 serves to urge the bead 122 more tightly into sealing contact with the cover and the casing.

Inner annular bead 126 accurately and evenly abuts the lower surface of the measuring chamber 80 and, independently of any sealing function between cover and casing, will resiliently press the measuring chamber 80 upwardly against the upper gasket 82 and into the upper partition recess 84 with an equally circumferentially distributed force. Preferably the inner seal-liner bead 126 is coaxial with the measuring chamber wall 112 and abuts the lower surface of the measuring chamber 80 in a circular pattern directly aligned with the chamber wall 112, as shown in FIGURE 6. Such alignment will introduce the least amount of side stresses into the measuring chamber vertical walls.

With the cover rim 106 directly abutting the casing surface 94, the rim surface 108 is positively located relative to the casing partition. With such dimension being positively determined, the resilient compressive mounting of the measuring chamber between the cover and the partition 76 can be predetermined, by a fixed thickness gasket 82 and inner bead 126, to place a desirable stress against the measuring chamber walls. As the pressure exerted by inner bead 126 on the measuring chamber 80 need not be as great as that which sealingly compresses the outer bead 122 within recess 92, the thickness of inner bead 126 can be less than outer bead 122 as is shown in FIGURE 7. Due to the inherent resiliency of seal flange bead 126, the measuring chamber 80, which can be of any suitable non-corrosive material, is free to expand or contract with temperature variations encountered during service and such expansions and contractions have no effect upon the sealing bead 122.

In the embodiments illustrated in FIGURES 2 and 5 the bottom wall of the measuring chamber and the combined liner and sealing element 55 or 114 define a chamber 65 or 130 below the measuring chamber. Liquid enters chamber 65 or 130 through a plurality of pressure equalizing and air bleed openings (not shown) in the bottom of the measuring chamber. This insures against unequal pressures on opposite sides of the bottom wall of the measuring chamber and prevents deformation of that wall. The pressure of the liquid seats the bottom and side walls of the liner 55 or 114 into intimate contact with the interior of the cover, flange 58 or 120 overlying face 48 or 108 and stretching if necessary to permit this coverage. When the water freezes and builds up pressure within the meter, approaching values that could damage the parts of the meter, the pressure is applied directly to the frost plate through the closely conformed liner. The combined liner and annular sealing element 55 or 114 is preferably formed of soft rubber or a plastic such as polyethylene, which have a much greater resistance to corrosion than the metals heretofore used in liner construction, and these elastomeric elements are readily conformable under line pressure to the mating surface of the frost plate without the production of corrosion inviting strains in the liner.

The invention may be embodied in other specific forms without departing from the spirit or essential characteristics thereof. The present embodiments are therefore considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. In combination, a hollow casing, a mechanism housing mounted in said casing, said casing having an opening large enough to permit insertion and withdrawal of said housing, said opening being provided with an annular surrounding recessed shoulder, a frangible cover mounted over said opening and having a continuous rim surface with a beveled outer periphery, an elastic non-metallic liner for said cover formed of waterproof material and having an integral flange overlying said rim and underlying the bottom of said housing, said integral flange having a thickened peripheral bead of uniform cross-section clamped between said casing shoulder and said beveled rim periphery, and means clamping said cover to said casing to compress the outer periphery of said flange between the casing and the cover.

2. In combination, a casing having an opening, a mechanism housing mounted in said casing in alignment with said opening, a cover over said opening having a continuous flat rim and a continuous beveled face outside said rim, a recessed shoulder in said casing surrounding said opening and facing the cover, the end face of the recess of said shoulder being in general alignment with the adjacent end wall of said housing, an elastic non-metallic liner having a central portion snugly conformable to the interior of said cover, a flat flange overlying said rim and a thickened peripheral bead of uniform cross-section on said flange disposed between said shoulder and said beveled face, and means securing said cover on said casing deformably compressing said bead in the assembly radially and axially between said recessed shoulder and the beveled face of said cover so that the inner portion of said bead engages the end face of said housing to form a resilient support therefor.

3. In combination: a generally hollow casing having an opening through an external wall; a cover over said opening having a continuous externally beveled rim; said casing being formed with a recessed shoulder surrounding said opening and facing said cover; a non-metallic elastic liner formed of elastomeric material and having a central portion snugly conformable to the interior surface of said cover, an integral flange portion overlying said rim and terminating in a thickened peripheral bead of uniform cross-section disposed within the recess of said shoulder and in abutment with the beveled edge of said rim; a mechanism housing slightly smaller in cross-section than said opening and so mounted within said casing that its peripheral edge adjacent said cover rests upon said bead; a gasket interposed between the opposite peripheral edge of said housing and a wall of said casing, and means for radially and axially compressing said bead between said shoulder and said beveled edge of said rim and against said housing to resiliently hold said mechanism housing in fluid tight engagement with said gasket and secure said cover to said casing.

4. In combination, a hollow casing, a mechanism housing mounted in said casing, said casing having an opening large enough to permit insertion and removal of said housing, a cover mounted over said opening and having a continuous rim surface underlying the bottom of said casing and a peripheral portion of the bottom of said housing, an elastomeric liner for said cover having an integral radial seal flange overlying said rim and underlying the bottom of said casing and said peripheral portion of the bottom of said housing and means clamping said cover to the casing to compress the outer periphery of said flange between the casing and cover, the periphery of said casing opening being formed with an annular recess providing an annular shoulder and peripheral side wall, and the outer periphery of said flange including an integral continuous annular bead of constant cross section compressed in assembly between said cover rim and said recess shoulder and side wall.

5. The combination defined in claim 4 wherein said flange includes a second integral annular bead concentric with said first named bead compressed in assembly against said peripheral portion of the bottom of said housing.

6. In combination a hollow casing having an opening with an annular recessed shoulder, a mechanism housing mounted in said casing opposite said opening, a cover over said opening having a continuous flat rim lying in a plane, said rim being of sufficient width to overlap the bottom opening and recessed shoulder and bear against the bottom of said casing, an elastic non-metallic liner formed of a water impermeable material snugly fitting said cover and deformable under fluid pressure into intimate engagement against said cover, an integral peripheral flange on said liner having a flat surface overlying and extending to a position intermediate of the width of said rim, an integral peripheral continuous bead disposed against said recessed shoulder and a second integral bead concentric with said first named bead on the side of said flange remote from said rim disposed within said opening, underlying and compressed against the bottom periphery of said housing, and means tightly securing said cover to the casing and clamping the liner flange between the cover, housing and casing.

7. In combination, a hollow casing adapted to contain liquid, a mechanism housing mounted in said casing, said casing having an opening large enough to permit insertion and withdrawal of said housing, a frangible cast iron cover mounted over said opening and having a continuous rim surface and a concave interior face of as-cast surface quality bounded by said rim surface, said cover being adapted to break in response to a predetermined pressure applied thereto as a result of freezing of liquid within said casing, an elastic non-metallic liner for said cover formed of elastomeric material and having an integral radial flange overlying said rim and underlying the bottom of said housing in the assembly in spaced relation thereto to define a liquid chamber therebetween, the housing underlying portion of said liner being sufficiently thin as to preclude any material inhibition of pressure transmission by liquid within said chamber to said cover resulting from freezing of liquid within said casing and elastically conformable under liquid pressure into uninterrupted surface to surface contact with said cover interior face to eliminate rust producing moisture retaining air pockets between said liner and said cast iron cover, and means clamping said cover to the casing to compress the outer periphery of said flange between the casing and cover to form a fluid tight seal therebetween.

8. In combination with a cast frangible frost plate frost protected water meter casing in which the inner face of the frost plate is of as-cast surface quality, a water impermeable non-metallic gasket interposed in fluid tight relation between the mating faces of the frangible frost plate and casing, a thin flexible water impermeable non-metallic liner for the inner face of the frost plate formed of the same material as said gasket, and a thin flexible water impermeable annular ring of the same gasketing material as said gasket joining said liner and said gasket in fluid tight relation and forming an extensible connection therebetween to permit conformance of said liner to the frangible frost plate inner face, said liner being sufficiently thin that no material portion of the pressure developed within said casing upon freezing of liquid therein is absorbed by compression of said liner and elastically conformable under liquid pressure into uninterrupted surface to surface contact with the frost plate inner face to eliminate moisture retaining air pockets therebetween.

9. A liquid meter comprising a fluid flow measuring device, a metallic meter casing enveloping said measuring device and formed with an inlet, an outlet and fluid passages therethrough for directing fluid from said inlet to said outlet through said measuring device, said casing having an access opening in its wall of sufficient size to permit passage of said measuring device therethrough, a cast metallic frangible frost plate cover having a continuous peripheral rim and a concave interior face of as-cast surface quality bounded by said rim and being secured to said casing over said access opening, a thin elastic non-metallic member forming a snugly fitting liner for said cover underlying said measuring device in spaced relation thereto to define a liquid chamber therebetween and having a continuous integral flange clamped between said peripheral rim of said cover and a mating surface on said casing to form a liquid tight seal therebetween, said liner being sufficiently thin that no material portion of the liquid pressure developed within said chamber upon freezing of liquid in said casing is absorbed by compression of said liner and being elastically conformable under liquid pressure into uninterrupted surface to surface contact with the cover interior face to eliminate moisture retaining air pockets therebetween.

10. In combination in a liquid meter having an open-bottomed metal casing and frangible means securing a cast iron metal frost plate across said open bottom of the casing, said frost plate having a concave inner surface of as-cast surface quality, a combination integral molded liner and gasket comprising a flexible highly pliable dish-shaped element of elastomeric material having a concavo-convex bottom wall shaped to substantially conform to the contour of the inner surface of said frost plate and adapted to be forced into snug uninterrupted surface to surface lining contact with said frost plate inner surface under pressure of water flowing through the meter to eliminate all potential rust producing moisture retaining air pockets between said liner bottom wall and said cast iron frost plate, an annular wall integral with and rising from the outer periphery of said bottom wall substantially conforming to and being sufficiently thin to be forced by normal water pressure within said casing into snug uninterrupted surface to surface lining contact with the corresponding inner side surface of said frost plate to eliminate all potential moisture retaining air pockets therebetween, and an annular flange integral with and extending from the upper edge of said side wall clamped between said casing and frost plate by said frangible means, so that said element functions both as a gasket to prevent leakage of fluid from the bottom of said casing and as a liner to prevent corrosion due to contact of the liquid with the frost plate, said liner being so formed that no material portion of the pressure developed within said casing upon freezing of liquid therein is absorbed by compression of said liner.

11. In a frangible frost plate frost protected liquid meter, an annular non-metallic elastomeric gasket of such construction as to provide a fluid tight seal, a cast frangible frost plate formed of a material subject to corrosion when exposed to moisture and an associated meter casing, said frost plate having an interior face of as-cast surface quality, non-metallic elastomeric means conformable under the influence of normal liquid pressure within said meter into uninterrupted surface to surface contact with the entire inner face of the frost plate for shielding the frost plate inner face from the corrosive effect of the fluid passing through the meter and for preventing the accumulation of moisture on the frost plate inner face by eliminating all potential moisture retaining air pockets therebetween, and non-metallic elastomeric means integral with and forming an extensible fluid tight connection between said gasket and said shielding means, the portion of said means conforming to the inner face of said frost plate being sufficiently thin that no material portion of the pressure resulting from freezing of liquid in said meter is absorbed by compression thereof.

12. The combination defined in claim 11 wherein said gasket and said means are all formed of a continuous sheet of molded polyethylene.

13. The combination defined in claim 11 wherein said gasket is a flat annular member.

14. The combination defined in claim 11 wherein said gasket comprises a substantially flat member including an annular bead.

15. In combination with a hollow casing having an access opening and a cast frangible frost plate formed of material subject to corrosion when exposed to moisture and having a concave inner surface of relatively rough as-cast surface quality and detachably secured to said casing over said opening, a combined frost plate liner and sealing element comprising a thin elastomeric non-metallic member formed of water impermeable material and having a central portion preformed to the shape of the frost plate inner face and conformable under the normal fluid pressure within the casing into uninterrupted surface to surface contact with the entire inner surface of said frost plate to eliminate all potential moisture retaining air pockets therebetween, said element having a flat rim clamped between a surface of said casing surrounding said opening and the rim of said frost plate to form a liquid tight seal therebetween, said member central portion being sufficiently thin that no material portion of pressure induced within said casing as a result of freezing of liquid therein is absorbed by compression of said central portion.

16. A frost plate liner and seal element as defined in claim 15 formed wholly of polyethylene.

17. In combination, a hollow casing, a mechanism housing mounted in said casing, said casing having an opening large enough to permit insertion and removal of said housing, a cast iron cover mounted over said opening and having a continuous rim surface surface underlying the bottom of said casing and a peripheral portion of the bottom of said housing and having a concave lower face of as-cast surface quality bounded by said rim surface, an elastomeric liner for said cover having an integral radial seal flange overlying said rim and underlying the bottom of said casing and said peripheral portion of the bottom of said housing and means clamping said cover to the casing to compress the outer periphery of said flange between the casing and cover, and to compress at least symmetrically disposed portions of said housing periphery underlying flange portion between said housing and cover to resiliently bias said housing into said casing, said liner having a concavo-convex central portion snugly interfitting with said cover inner face and conformable under normal liquid pressure within said casing into uninterrupted surface to surface contact with the entire cover inner face to eliminate all potential moisture retaining air pockets therebetween and being sufficiently thin that no material portion of the pressure induced within said casing as a result of freezing of liquid therein is absorbed by compression of said liner central portion.

(References on following page)

References Cited in the file of this patent

UNITED STATES PATENTS

| | | |
|---|---|---|
| 785,116 | Perry | Mar. 21, 1905 |
| 1,187,679 | Tilden | June 20, 1916 |
| 1,477,748 | Bissell | Dec. 18, 1923 |
| 1,565,793 | Christman | Dec. 15, 1925 |
| 1,845,536 | Weymouth | Feb. 16, 1932 |
| 2,307,440 | Wilson | Jan. 5, 1943 |
| 2,406,877 | Whittaker | Sept. 3, 1946 |

FOREIGN PATENTS

| | | |
|---|---|---|
| 1,038,487 | France | May 13, 1953 |
| 645,971 | Germany | June 5, 1937 |